United States Patent [19]

Ohtaka et al.

[11] Patent Number: 4,670,645
[45] Date of Patent: Jun. 2, 1987

[54] FOCUS DETECTING DEVICE WITH SHADING REDUCTION OPTICAL FILTER

[75] Inventors: Keiji Ohtaka, Tokyo; Akira Akashi, Yokohama; Akira Ishizaki, Yokohama; Yasuo Suda, Yokohama; Akira Hiramatsu, Yokohama, all of Japan

[73] Assignee: Canon Kabushiki Kaisha, Tokyo, Japan

[21] Appl. No.: 659,950

[22] Filed: Oct. 11, 1984

[30] Foreign Application Priority Data

Oct. 17, 1983 [JP] Japan .......................... 58-160402[U]

[51] Int. Cl.⁴ .............................................. G01J 1/20
[52] U.S. Cl. ..................................... 250/201; 250/204
[58] Field of Search ................. 250/201, 204, 237 G; 350/311, 314; 354/402, 406, 407, 408

[56] References Cited

U.S. PATENT DOCUMENTS

| | | | |
|---|---|---|---|
| 3,981,565 | 9/1976 | Karasawa | 350/314 |
| 4,187,002 | 2/1980 | Roziere | 350/314 |
| 4,247,763 | 1/1981 | Stauffer | 250/204 |
| 4,547,663 | 10/1985 | Kitagishi | 250/204 |

*Primary Examiner*—David C. Nelms
*Attorney, Agent, or Firm*—Fitzpatrick, Cella, Harper & Scinto

[57] ABSTRACT

This specification discloses a focus detecting system in which a plurality of images are formed on the basis of light beams passing through different portions of the pupil of an objective lens and the focus state of the objective lens is detected from the relative positional relation of these images and wherein filters of which the density distribution varies along the direction of arrangement of photoelectric conversion elements are disposed in front of photoelectric conversion element arrays for detecting the distributions of quantity of light of the images, thereby accomplishing shading correction.

8 Claims, 8 Drawing Figures

FOCUS DETECTING DEVICE WITH SHADING REDUCTION OPTICAL FILTER

BACKGROUND OF THE INVENTION

1. Field of the Invention

This invention relates to a focus detecting device in which a plurality of images are formed on the basis of light beams passing through different portions of the pupil of an objective lens and the focus state of the objective lens is detected from the relative positional relation of these images.

2. Description of the Prior Art

Focus detecting devices of this type are well known and it has been considered to apply them chiefly to single lens reflex cameras.

FIG. 1 of the accompanying drawings shows an example of the focus detecting device of this type according to the prior art. In FIG. 1, reference numeral 0 designates the surface of an object to be photographed, reference numeral 1 denotes a phototaking lens in a single lens reflex camera, not shown, reference numeral 3 designates a field lens provided near the predetermined imaging plane (the image pickup plane of the camera)2 of the photo-taking lens 1, reference numerals 4 and 5 denote secondary imaging lenses for forming two secondary images on the basis of light beams passing through different portions 1a and 1b, respectively, of the pupil of the photo-taking lens 1, and reference numerals 6 and 7 designate photoelectric conversion element arrays for detecting the secondary images formed by the secondary imaging lenses 4 and 5. The element arrays 6 and 7 each are comprised, for example, of CCD (charge coupled device) or the like. In this device, when, for example, the photo-taking lens 1 is moved leftwardly as viewed in FIG. 1 to provide a front focus state, the images of the object to be photographed formed on the light-receiving surfaces of the respective photoelectric conversion element arrays 6 and 7 by the secondary imaging lenses 4 and 5 deviate in the directions of arrows and thus, the front focus state and the amount thereof are detected from the variations in the outputs of the photoelectric conversion element arrays 6 and 7 corresponding to the relative deviation of these images. Also, in the case of the rear focus state, the respective images deviate in the directions opposite to the directions in the case of the front focus state and thus, the rear focus state and the amount thereof are detected.

Now, the field lens 3 is for causing the pupils 4a and 5a of the secondary imaging lenses 4 and 5 to be imaged on different pupil portions 1a and 1b of the photo-taking lens 1 and keeping the uniformity of the quantities of incident light on the light-receiving surfaces of the photoelectric conversion element arrays 6 and 7, and is important for improving the detection accuracy of such device, but generally the field lens is required to be of a simple construction for reasons such as the space in the camera, the cost and the convenience of manufacture and therefore, a single lens is often used as the field lens 3. Accordingly, in this lens, aberrations have been relatively great and it has been difficult to make the pupils 4a and 5a of the secondary imaging lenses 4 and 5 completely coincident with the pupils 1a and 1b, respectively, of the photo-taking lens 1.

Therefore, in such a focus detecting device, the so-called shading occurs and even for a surface of uniform brightness, the non-uniformity of the quantity of light as indicated by solid line, for example, in FIG. 2 of the accompanying drawings remains on the light-receiving surfaces of the photoelectric conversion element arrays 6 and 7. FIG. 2 shows the distribution of quantity of light on each element array when the light-receiving surface of each photoelectric conversion element array 6, 7 shown in FIG. 1 is seen from the direction of arrow A. Generally, non-uniform distribution of quantity of light is a distribution in which the left and right have been reversed in the relative relation of the photoelectric conversion element arrays 6 and 7, while on the element arrays, it is a distribution asymmetrical with respect to the center lines 6a and 7a of the light-receiving surfaces of the element arrays and therefore, when a point P provided on the object surface 0 of FIG. 1 is considered, the quantities of light at corresponding points P1 and P2 on the element arrays differ from each other, and this may result in reduced detection accuracy of the amount of deviation of the image.

As a result, the device of this type according to the prior art has suffered from the problem that accurate focus detection is difficult.

SUMMARY OF THE INVENTION

It is an object of the present invention to provide a focus detecting device of high detection accuracy which eliminates the above-noted disadvantages peculiar to the device according to the prior art.

It is another object of the present invention to provide a focus detecting device having its detection accuracy enhanced by a very simple construction.

Other objects of the present invention will become apparent from the following detailed description of some embodiments of the invention taken in conjunction with the accompanying drawings.

DESCRIPTION OF THE PREFERRED EMBODIMENTS

Figure 1:
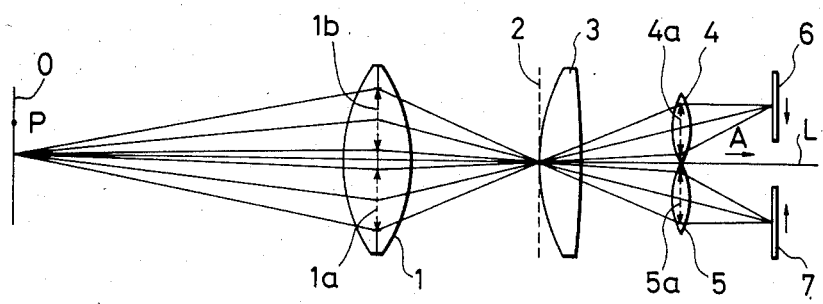
FIG. 1 shows an example of the focus detecting device according to the prior art.
Figure 2:
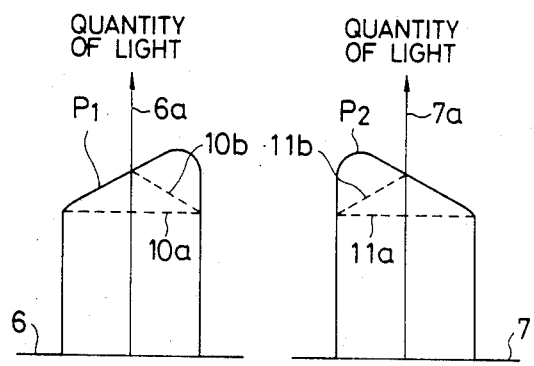
FIG. 2 shows the distributions of quantity of light on photoelectric conversion element arrays in the device of FIG. 1.
Figure 3:
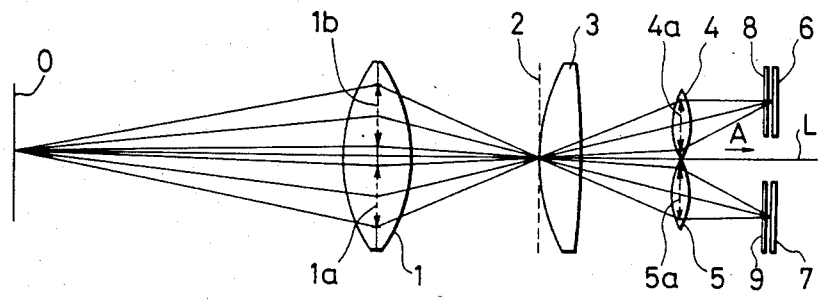
FIG. 3 shows an embodiment of the focus detecting device of the present invention.
Figure 4:
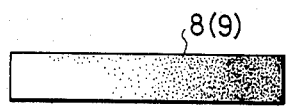
FIG. 4 shows an example of the filter in the present embodiment.

Referring to FIG. 3, reference numeral 0 designates the surface of an object, reference numeral 1 denotes a photo-taking lens, reference numeral 2 designates the focal plane, reference numeral 3 denotes a field lens, reference numerals 4 and 5 designate secondary imaging lenses, and reference numerals 6 and 7 denote photoelectric conversion element arrays which are similar in construction and function to those shown in FIG. 1. In FIG. 3, reference numerals 8 and 9 designate optical filters provided in front of the photoelectric conversion element arrays 6 and 7, respectively. The filters 8 and 9 are disposed so that as shown in FIG. 4, the density distribution thereof continuously varies from one end toward the other end and in front of the light-receiving surfaces of the photoelectric conversion element arrays 6 and 7, the density distribution thereof varies along the light-receiving surfaces of the photoelectric conversion element arrays 6 and 7. Also, in this case, the filters 8 and 9 are disposed so that the density distribution thereof is symmetrical about the optic axis L, and are set so that the distributions of quantity of light of the photoelectric conversion element arrays 6 and 7 are uniform like the distributions of quantity of light shown in FIG. 6. That is, the filters 8 and 9 are disposed so as to cut the quantities of light in the portions above dotted lines 10a and 11a, of the quantities of light on the light-receiving surfaces of the photoelectric conversion element arrays 6 and 7 shown in FIG. 2, and make the distributions of quantity of light on the light-receiving surfaces of the element arrays 6 and 7 constant. Thus, the filters make highly accurate focus detection possible.

Figure 5:
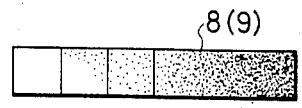
FIG. 5 shows another example of the filter.

The density variations of the filters 8 and 9 need not always be continuous, but may also be stepwise as shown in FIG. 5.

Figure 7:
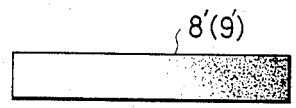
FIG. 7 shows still another example of the filter

Another embodiment of the present invention will now be described. In the above-described embodiment, the filters 8 and 9 have density distributions which make the distributions of quantity of light great and the light-receiving surfaces of the photoelectric conversion element arrays 6 and 7 constant, and in detecting the amount of deviation between two images from the outputs of the photoelectric conversion element arrays 6 and 7, the above-described embodiment can detect it most accurately and can be said to be ideal, while it suffers from disadvantages as will be described below. That is, in the above-described filters 8 and 9, the quantities of light in the other portions must be attenuated to the level of the portion in which the quantities of light are minimum on the light-receiving surfaces of the photoelectric conversion element arrays 6 and 7 and therefore, the loss of quantity of light is great and this is not preferable in respect of brightness. FIG. 7 shows filters 8' and 9' which alleviate such a problem. In these filters 8' and 9', the density thereof varies continuously from one end thereof to the central portion. That is, these filters 8' and 9' eliminate, in the light-receiving surfaces of the photoelectric conversion element arrays 6 and 7, the asymmetry of the distributions of quantity of light with respect to the center lines 6a and 7a thereof, and have such density distributions that cut the quantities of light in the portions above dotted lines 10b and 11b in the distributions of quantity of light in the element arrays 6 and 7 shown in FIG. 2. Thus, if the filters 8' and 9' are disposed in front of the respective photoelectric conversion element arrays 6 and 7 so that the density distribution thereof is symmetrical about the optic axis L and that the density becomes gradually thinner from one end thereof which is proximate to the optic axis L, there will be obtained the distributions of quantity of light as shown in FIG. 8 on the light-receiving surfaces of the photoelectric conversion element arrays 6 and 7, and not only the distributions of quantity of light on the light-receiving surfaces of the element arrays 6 and 7 will be symmetrical with respect to the center lines 6a and 7a, respectively, thereof, but also the distributions of quantity of light on the element arrays 6 and 7 will become equal to each other.

Figure 6:
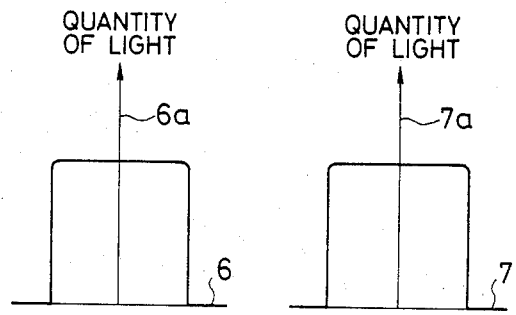
FIG. 6 shows an example of the distributions of quantity of light on the photoelectric conversion element arrays in the present embodiment.
Figure 8:
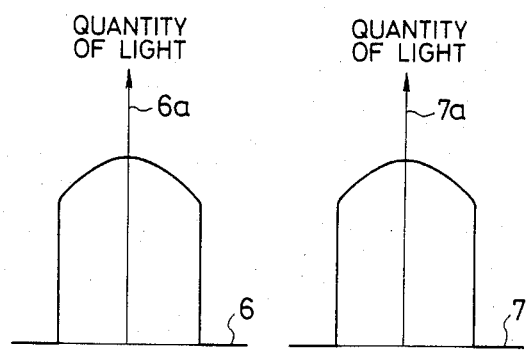
FIG. 8 shows another example of the distributions of quantity of light on the photoelectric conversion element arrays in the present embodiment.

In a focus detecting device of the deviation type, the object images on the light-receiving surfaces of the photoelectric conversion element arrays 6 and 7 move relative to each other in opposite directions during non-in-focus and therefore, during the detection of the amount of deviation through the element arrays 6 and 7, the non-uniform distributions of quantity of light as shown in FIG. 8 may result in reduced detection accuracy, but the amount of such reduction is about ½ as compared with the case of FIG. 2 and the loss of quantity of light is reduced to about ½ or less as compared with the case of FIG. 6, and this is preferable in practice. Also, even for the distributions of quantity of light shown in FIG. 8, it is possible to maintain the same degree of detection accuracy as that in the case of the uniform distributions of quantity of light as shown in FIG. 6 in the vicinity of the in-focus point.

According to the present invention, as described above in detail, in the focus detecting device of the so-called deviation type, the non-uniformity and asymmetry of the distributions of quantity of light on the photoelectric conversion element arrays can be eliminated by a very simple construction and the detection accuracy can be improved.

What we claim is:

1. A focus detecting device for detecting the focus state of an objective lens, including:
   optical means for forming a plurality of images having a relative positional relation which changes in accordance with focus state of the objective lens, on the basis of a light beam from the objective lens;
   sensing means for sensing the information of a distribution of quantity of light of each of said images; and
   correcting means for eliminating the influence of shading from an output of said sensing means.

2. A focus detecting device according to claim 1, wherein said correcting means has an optical filter positioned between said objective lens and said sensing means.

3. A focus detecting device according to claim 2, wherein said filter is provided for each of said images and the density distribution thereof is made symmetrical about a boundary between said images.

4. A focus detecting device according to claim 3, wherein the density distribution of said filter spatially varies continuously from one end thereof toward the other end.

5. A focus detecting device according to claim 3, wherein the density distribution of said filter varies stepwisely from one end thereof toward the other end.

6. A focus detecting device according to claim 1, wherein said sensing means comprises sensing ranges respectively corresponding to each of said plurality of images; said correcting means is located between said optical means and said sensing means; and said correcting means has an optical filter whose density spatially changes in a direction from one edge of each sensing range to the other edge.

7. A focus detecting device according to claim 6, wherein said change of the density is continuous.

8. A focus detecting device according to claim 6, wherein said change of the density is step by step.

* * * * *